J. B. WEBBER, Jr.
POWER EXCAVATOR.
APPLICATION FILED JAN. 17, 1910.
Reissued Apr. 26, 1910.
13,107.
2 SHEETS—SHEET 1.
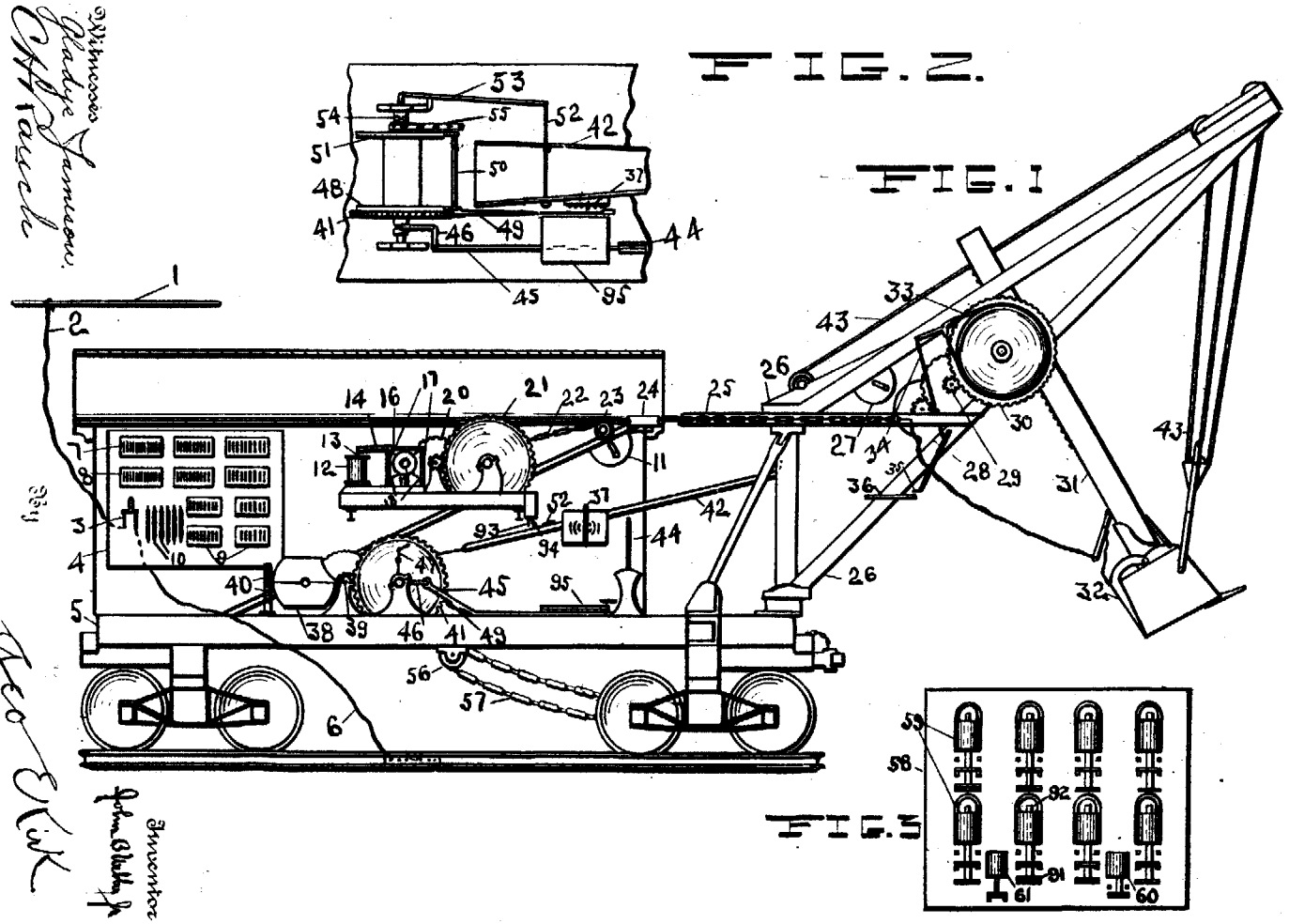
Witnesses
Gladys Jamison.
C H Rauch
Inventor
John B Webber Jr
By
Geo E Kirk
Attorney
NORRIS PETERS INC. LITHO. WASHINGTON D.C.

J. B. WEBBER, JR.

POWER EXCAVATOR.

APPLICATION FILED JAN. 17, 1910.

Reissued Apr. 26, 1910.

13,107.

2 SHEETS—SHEET 2.

Witnesses
Gladys Jameson
C. H. Rauch

Inventor
John B. Webber Jr.

By
Geo. Ekirk
Attorney

NORRIS PETERS INC., LITHO., WASHINGTON, D. C.

UNITED STATES PATENT OFFICE.

JOHN B. WEBBER, JR., OF TOLEDO, OHIO, ASSIGNOR TO THE VULCAN STEAM SHOVEL COMPANY, OF TOLEDO, OHIO, A CORPORATION OF OHIO.

POWER-EXCAVATOR.

13,107. Specification of Reissued Letters Patent. Reissued Apr. 26, 1910.

Original No. 884,439, dated April 14, 1908, Serial No. 410,891. Application for reissue filed January 17, 1910. Serial No. 538,550.

*To all whom it may concern:*

Be it known that I, JOHN B. WEBBER, Jr., a citizen of the United States, residing at Toledo, Lucas county, Ohio, have invented a new and useful Power-Excavator, of which the following is a specification.

This invention relates to a power driven working member and especially to the rapid, easy and economical handling thereof.

This invention has utility when embodied in an excavator wherein the disposal of the prime movers and the features of operation and control, notwithstanding the increased speed available, insure certain and positive action which is most efficient.

Figure 4:
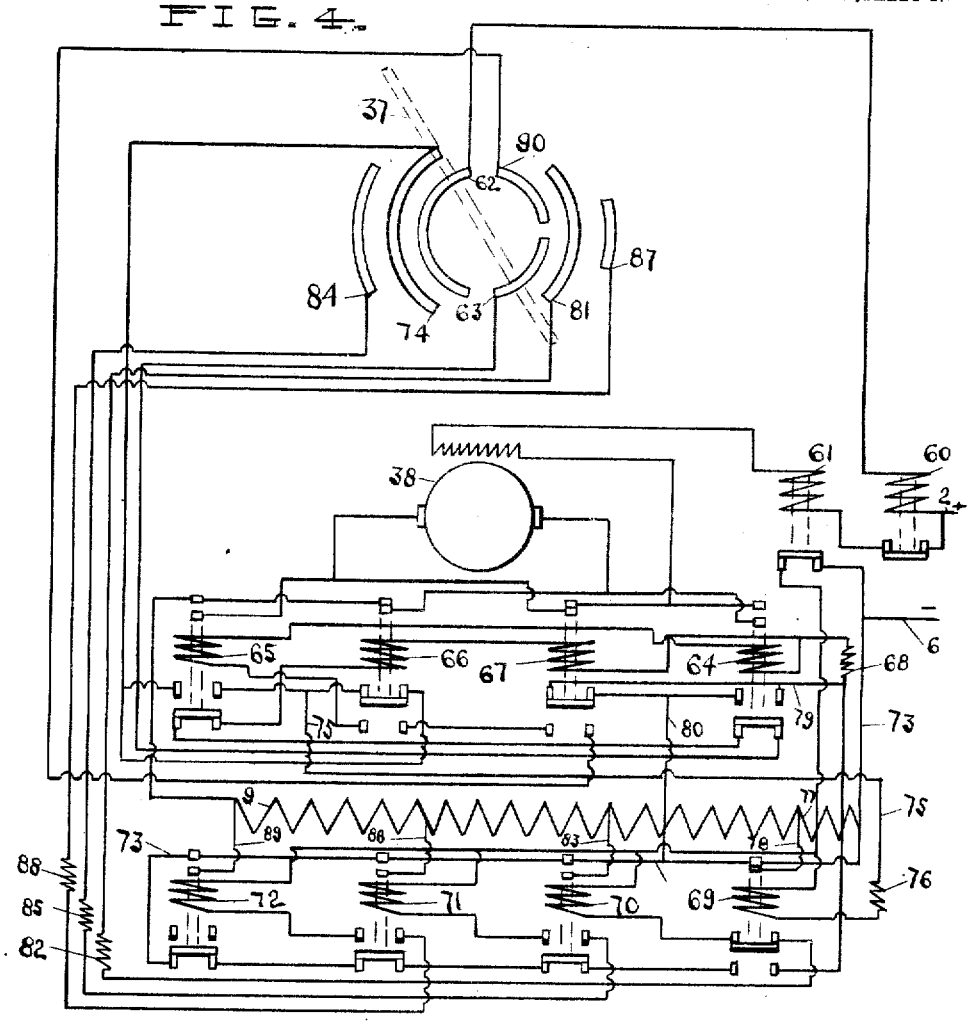
Figure 5:
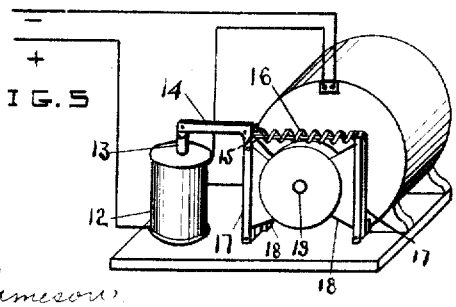

Referring to the drawings: Figure 1 is an embodiment of the invention in a power shovel, the showing being a side elevation with the housing broken away; Fig. 2 is a fragmentary plan view of one of the prime movers with some of the controlling connections; Fig. 3 is an elevation of automatic governing features for one of the prime movers; Fig. 4 is a diagram showing the inter-relation of controller with the governing features of Fig. 3; and Fig. 5 is a perspective view of scheme for release of boom swing when power is applied.

From a source of supply of power, as trolley wire 1, conductor or line 2, extends to switch 3 on distributing board 4 in the vehicle or car 5. The power return from the switch 3 is through line 6, herein shown as to ground return through rail. On this board 4 are resistances 7, 8, 9, for the various prime movers, as well as fuses 10 in the leads to these prime movers.

Through controller 11 the swing of the boom is brought about. Upon throwing the controller to supply power to swing the boom, by means of solenoid 12, core 13 is drawn therein to pull lever 14 having cam arm 15 working on a rod against the resistance of spring 16 to force arms 17 apart and thereby move brake shoes 18 to release the shaft 19 of the prime mover. The power thus releasing the brake at once drives this reversible prime mover in the direction for which the controller is thrown, and through gear 20 upon intermediate shaft, actuates gear 21 on the drum shaft. From the drum extends flexible means 22 over guides 23, 24 to the turn table 25 of the boom or forwardly overhanging frame 26. When the limit of throw desired is reached, power is shut off by controller 11, and the brake shoes 18 at once lock shaft 19 and hold the boom. When not swinging, the boom is locked by brake shoes 18.

Controller 27 in the boom for prime mover 28, like controller 11, serves as a starting device and the prime mover is also reversible. The prime mover 28, as well as the other prime movers herein shown, is dead centerless, and so with but this single prime mover the many stoppings and startings may be made at any angular position and no difficulty experienced. The introduction of intermediate shaft 29 between prime mover 28 and gear 30, makes possible most accurate handling through directing member 31 of the working member 32, as considerable movement by the prime mover means but little travel of the digging member 32. As the prime mover is high speed, this feature still permits of most rapid handling.

To yieldingly brake when permitting the shovel 32 to move to or from the boom, and to lock the handle 31 against movement when desired, there is provided adjacent gear 30 a friction surface engaged by strap brake or band 33 actuated through linkage 34 from foot lever 35 adjacent operator's station 36 on the boom.

Controller 37 is for prime mover 38 pivotally mounted on intermediate shaft 39 and yieldably poised by springs 40, that the transmission of strains thereto from sudden variations of load may be cushioned and thus save the prime mover. By intermediate shaft 39 the gear 41 on the drum shaft is driven. Chain or cable way 42 extends from the drum to the boom pivot, in which travels the flexible means 43 over the boom to the dipper or shovel 32, that it may be pulled or hoisted into the material handled. In operation the digging member meets with widely varying resistance which affects its speed of operation, as well as power consumption to overcome such resistance.

Controller 44, through link 45, bell crank lever 46 and linkage 47, serves through frictional band 48 to clutch gear 41 to actuate the drum that flexible means 43 may be actuated.

By means of foot lever 49 and rock shaft 50 the brake band 51 may be controlled to hold or release the drum engaged by the flexible means 43.

Through link 52 and lever 53, clutch 54 may be thrown in to connect to the drum shaft and thus drive sprocket chain 55, and through wheel 56 and flexible connection 57 propel the vehicle or car 5.

Facing the switchboard 4 in the car 5 is switchboard 58 having thereon governing and controlling features, including reversing and throttling solenoids 59, solenoid 60 connecting a switch to effect starting of prime mover 38, and solenoid 61 to cut in the resistance at overloads and thus throttle power supply.

Referring to Fig. 4; with the controller lever 37 in mid position no power is supplied to prime mover 38, while movement toward dotted line position first connects contacts 62, 63 through solenoid 60 with main 2, and the power passing lower set of terminals at solenoids 64, 65, energizes solenoids 66, 67, that the series motor 38 may be connected for forward operation. That this current through the solenoids may not be excessive, resistance 68 is introduced, from which the current passes through lower terminals of resistance inserting or governing solenoids 69, 70, 71, 72, and by line 73 to return main 6. Further movement of the controller 37 to the dotted line position shown in Fig. 4, brings contact 74 in circuit, which through upper terminals of solenoid 66, line 75, resistance 76 to cut down the current, energizes solenoid 69, the core therein rising and thus through line 78 cutting out portion 77 of the resistance 9. This movement of the core of solenoid 69 breaks the circuit through the lower terminals from resistance 68 to line 73, but as solenoid 67 is energized, this current by line 79 may by-pass through terminals thereon from resistance 68 and by connection 80 reach line 73. Additional movement of controller 37 will reach contact 81, current from which is cut down by resistance 82 and which then through terminals at solenoid 69 will energize solenoid 70 and thus short through conductor 83 to line 73 to cut out additional resistance 9. Likewise from contact 84, current through resistance 85, passing terminals at solenoid 70 to energize solenoid 71 shorts through conductor 86 to cut out another section of resistance 9. The next contact reached in this forward movement of controller 37, is contact 87, from which current through resistance 88, passes through terminals at solenoid 71 to energize solenoid 72 and thus by lead 89 cut out the balance of the resistance 9 when the prime mover is up to speed. To reverse, the controller 37 is thrown from mid position to contact 90 instead of 63, serving to energize solenoids 65 and 64, instead of 66 and 67, to oppositely drive the motor 38. Further movement of controller 37 cuts out resistance as in forward driving.

That current which flows to energize the solenoids 69, 70, 71, 72, passes to terminals at solenoid 61 before reaching return main 6. Solenoid 61 is in series with the prime mover 38, and whenever the power supplied exceeds that for which solenoid 61 is set to control, the core of this solenoid is raised to break the circuit through solenoids 69, 70, 71, 72, and the resistance 9 is all thus automatically cut in to throttle the power supplied, and thus not only avoid danger to the prime mover but also avoid undue drop on the line. The completion of circuit through the forward or reversing solenoids and line 73 permits energizing of solenoid 60 to cut in the motor 38. Accordingly with the resistance 9 all cut in there is still power supplied, and as the work at the shovel eases up and the motor picks up speed, the resistances will successively and automatically be cut out. There are weight disks 91 placed on the solenoid cores 92, thus adjusting the action of the solenoids to the power supply. This automatic governor-controller device for prime mover 38 is also effective as a circuit breaker, while for the swing prime mover and prime mover 28 circuit breakers 93 and 94 are provided. All control of the propelling, the pulling of the shovel and swinging of the boom is within reach of operator at station 95.

In the disclosure herein of the various features of driving with no dead center to overcome, of brake holding device for swing when not being turned, and of self-governing controller that the pull on the digging member is gaged with the rate of travel of the shovel, the power as adapted is electricity, direct current system being shown. In the governing of the pull on the digging member, when its speed is materially reduced, excessive power consumption is avoided, but the motor has its first speed current with a torque available to constantly and gradually urge ahead, and as the digging member encounters less resistance, the increasing speed is automatically taken care of by this throttling system of governing inter-connected with the controller.

What is claimed and it is desired to secure by Letters Patent is:

1. A power excavator comprising a digging member, a directing member therefor, rotatable means to actuate the directing member, a boom, and a dead-centerless prime mover on the boom to accentuate the means.

2. A power excavator comprising a vehicle, a digging member carried thereby, a dead-centerless prime mover for thrusting the member, a prime mover for swinging the member, a power receiving and distributing board carried by the vehicle, and a starting device for each prime mover.

3. A power excavator comprising a vehicle, a digging member carried thereby, a prime mover for pulling the member, a prime mover for swinging the member, a dead-centerless prime mover for thrusting the member, and connecting means for conducting power to and from the vehicle.

4. A power excavator comprising a vehicle having an overhanging frame, a directing member movably mounted in said frame, a digging member carried by the directing member, dead-centerless prime movers for operating the member, a power receiving and distributing board, and controllers for the prime movers by which power is distributed.

5. A power excavator comprising a shovel, a mounting for the shovel including an overhanging frame and a directing member for the shovel movably mounted in said frame, a prime mover connected to the mounting to actuate the shovel, a brake coacting to limit the actuation of the shovel, and connections automatically releasing the brake as power is supplied to the prime mover.

6. A power excavator having a digging member, a mounting for the digging member, and a yieldably poised prime mover for operating the member.

7. A vehicle having a boom, a working member provided with a directing member movably carried by the boom, a prime mover for swinging the boom, a brake coacting to limit the swing of the boom, and connections automatically releasing the brake as power is supplied to the prime mover.

8. A power excavator comprising a boom, a digging member, a directing member for the digging member movably mounted in the boom, a dead-centerless prime mover carried by the boom for actuating the directing member, and a brake for holding the directing member.

9. An excavator comprising an overhanging frame, a directing member mounted in the frame, a shovel carried by the directing member, a prime mover for actuating the shovel, a supply for delivering power to the prime mover, and controlling connections for the prime mover including governing means affected by the operation of the shovel, said means including a plurality of independently operable elements disposed in and actuated by the power supply to throttle the supply as the speed of the shovel decreases.

10. A power excavator comprising an overhanging frame, a directing member mounted in the frame, a shovel carried by the directing member, a prime mover for actuating the shovel, a supply for delivering power to the prime mover, and a controller for the prime mover including automatically operating governing means disposed in and actuated by the power supply to throttle the power supply as the speed of the shovel decreases and to automatically cut out this throttling of the supply in order that the shovel may recover normal speed.

11. A power excavator comprising an overhanging frame, a directing member mounted in the frame, a shovel carried by the directing member, a prime mover for actuating the shovel, a supply for delivering power to the prime mover, and an adjustable governor-controller including a plurality of independently operable elements disposed in and actuable by the power supply to throttle the supply as the speed of the shovel decreases.

12. An excavator comprising a digging member, a prime mover therefor, a supply for delivering power to the prime mover, and an electric governing device including a plurality of independent successively operable elements disposed in and actuable by the power supply to preclude excessive power consumption in the prime mover by automatically and varyingly throttling the supply.

In testimony whereof I affix my signature in the presence of two witnesses.

JOHN B. WEBBER, Jr.

Witnesses:
A. W. Platt,
Geo. E. Kirk.

Correction in Reissue Letters Patent No. 13,107.

It is hereby certified that in Reissue Letters Patent No. 13,107, reissued April 26, 1910, upon the application of John B. Webber, jr., of Toledo, Ohio, for an improvement in "Power-Excavators," an error appears in the printed specification requiring correction as follows: Page 2, line 126, the word "accentuate" should read *actuate;* and that the said Letters Patent should be read with this correction therein that the same may conform to the record of the case in the Patent Office.

Signed and sealed this 23rd day of August, A. D., 1910.

[SEAL.]

F. A. TENNANT,

*Acting Commissioner of Patents.*